(12) United States Patent
Bishop et al.

(10) Patent No.: US 7,968,480 B2
(45) Date of Patent: Jun. 28, 2011

(54) MULTI-LOBAL FIBER CONTAINING NONWOVEN MATERIALS AND ARTICLES MADE THEREFROM

(75) Inventors: Nyle Bishop, Mooresville, NC (US); Enrique Martinez, San Luis Potosi (MX); Pierre D. Grondin, Mooresville, NC (US); Michel Delattre, Erquinghem-lys (FR); Jorge Santisteban, Seccion (MX)

(73) Assignee: Polymer Group, Inc., Charlotte, NC (US)

( * ) Notice: Subject to any disclaimer, the term of this patent is extended or adjusted under 35 U.S.C. 154(b) by 132 days.

(21) Appl. No.: 12/159,417

(22) PCT Filed: Feb. 14, 2007

(86) PCT No.: PCT/US2007/003745
§ 371 (c)(1),
(2), (4) Date: Dec. 1, 2008

(87) PCT Pub. No.: WO2007/095214
PCT Pub. Date: Aug. 23, 2007

(65) Prior Publication Data
US 2009/0246492 A1 Oct. 1, 2009

Related U.S. Application Data

(60) Provisional application No. 60/773,896, filed on Feb. 15, 2006, provisional application No. 60/798,721, filed on May 9, 2006.

(51) Int. Cl.
*D04H 1/00* (2006.01)
*D04H 13/00* (2006.01)
*D04H 3/00* (2006.01)
*B32B 5/26* (2006.01)

(52) U.S. Cl. ......... 442/335; 442/381; 442/401; 428/219

(58) Field of Classification Search .................. 442/335, 442/381, 401; 428/219
See application file for complete search history.

(56) References Cited

U.S. PATENT DOCUMENTS

| 4,401,454 | A | 8/1983 | Fritz et al. |
| 6,050,047 | A | 4/2000 | Covelli et al. |
| 6,815,383 | B1 * | 11/2004 | Arnold .......................... 442/362 |

(Continued)

FOREIGN PATENT DOCUMENTS

| EP | 0421649 B1 | 4/1991 |
| WO | 2007/095214 A2 | 8/2007 |

OTHER PUBLICATIONS

International Search Report of priority application No. PCT /US07/ 03745, Form PCT/ISA/210, Sep. 24, 2007, 2 pages. International Preliminary Report on Patentability, priority appln. No. PCT/US07/ 03745, 6 pages.

*Primary Examiner* — Norca L Torres-Velasquez
(74) *Attorney, Agent, or Firm* — Kilyk & Bowersox, P.L.L.C.; Valerie Calloway

(57) ABSTRACT

Nonwoven polymer materials and articles made therefrom. Materials of the invention include at least one nonwoven polymer web with at least one layer of at least about 50% by weight of a multi-lobal fiber. Materials and articles of the invention have improved properties, such as particle retention capacity, acoustic absorption, stiffness, crop color uniformity, and crop yield, when compared with nonwoven polymer materials and articles made with round fiber in place of all of the multi-lobal fiber.

29 Claims, 8 Drawing Sheets

101

U.S. PATENT DOCUMENTS

| | | |
|---|---|---|
| 7,060,149 B2 | 6/2006 | Ortega et al. |
| 7,192,550 B2 | 3/2007 | Berger et al. |
| 2003/0049988 A1* | 3/2003 | Ortega et al. ................ 442/334 |
| 2003/0096114 A1* | 5/2003 | Chen et al. .................... 428/397 |
| 2004/0121680 A1 | 6/2004 | Yahiaoui et al. |
| 2005/0026527 A1 | 2/2005 | Schmidt et al. |
| 2005/0186299 A1 | 8/2005 | Berger et al. |
| 2005/0202741 A1 | 9/2005 | Onodera et al. |
| 2006/0012072 A1 | 1/2006 | Hagewood et al. |

* cited by examiner

MULTI-LOBAL FIBER CONTAINING NONWOVEN MATERIALS AND ARTICLES MADE THEREFROM

CROSS-REFERENCE TO RELATED APPLICATIONS

This application is a National Stage Application of PCT/US07/03745, filed Feb. 14, 2007, which claims benefit of priority to U.S. Provisional Application Nos. 60/773,896, filed Feb. 15, 2006, and 60/798,721, filed May 9, 2006, the disclosures of both of which are hereby incorporated by reference in their entireties.

TECHNICAL FIELD

The present invention relates to nonwoven fibrous materials that contain multi-lobal fibers or filaments and more specifically to nonwoven materials containing multi-lobal fibers and articles made therefrom that are useful in the industrial, acoustical, agricultural, clean room, and packaging industries.

BACKGROUND OF THE INVENTION

Nonwoven materials containing multi-lobal fibers are well known in the art. Nonwoven materials including multi-lobal fibers are described in U.S. Pat. No. 6,815,383 (describing filter media containing side-by-side bicomponent multi-lobal fibers comprised of higher and lower melting polymer components on different sides thereof); and United States Published Application No. 2006/0012072 (describing spinneret systems and methods for forming shaped fiber fabrics using a spinneret including mixtures of orifice geometries so as to form a blend of two or more types of fibers or filaments having different shapes or cross-sectional geometries); United States Published Application No. 2003/0049988 (describing the use of nonwoven fabrics comprising a plurality of filaments with a molecular orientation bonded to one another).

A need remains for improved nonwoven polymer materials containing multi-lobal fibers and having improved properties that are useful in, for example, clean room and industrial wipe applications, in components of acoustical systems, in packaging materials and systems, and in agricultural applications.

SUMMARY OF THE INVENTION

The present invention is directed toward nonwoven polymer materials containing at least one web that includes at least 50% by weight multi-lobal fibers, wherein the materials are useful in, for example, agricultural, packaging, clean room, industrial, or acoustical applications. Multi-lobal fibers useful in the invention can be continuous or discontinuous; and they can be made from polymeric materials, such as, but not limited to, polyesters, polyolefins, or mixtures or co-polymers thereof.

In one embodiment, nonwoven polymer materials are provided that include at least one nonwoven polymer layer containing at least one web made of at least about 50% by weight of a multi-lobal fiber, which are useful for protecting crops, such as fruits, vegetables, and mixtures thereof, from frost and insects. In an embodiment, crops protected by nonwoven breathable barrier materials of the invention produce a crop yield of at least 5% greater than the crop yield of crops protected by a comparable nonwoven material that differs insofar as all the multi-lobal fibers is replaced with round fibers (that is, the fiber polymer chemical composition, fiber/filament denier, fabric basis weight, and overall material construction are approximately the same except for the cross-sectional shape of the multi-lobal fiber/filament are round). In addition, crops protected by materials of the invention can have a color uniformity in its fruits that is at least 10% greater than the color uniformity in fruits that are protected by materials with all of the multi-lobal fibers replaced by round fibers. In addition, crops protected by materials of the invention can suffer less damage from direct sunlight than a material of similar overall construction that differs insofar as all multi-lobal fiber is replaced with round fibers. The materials of this embodiment of the invention can reduce light transmittance in the visible light range, for example, the 300-800 nm spectral wavelength range, by at least 10% and no more than 65%. Materials of the invention can be used to protect fruits and/or vegetables growing in or on the ground or trees from frost and/or insects. The nonwoven polymer breathable barrier materials used for protection of agricultural products may be used alone or in combination with one or more different or similar materials as a protective article.

In another embodiment, wipe materials are provided that are made of materials having at least one layer of one web that is 50% by weight of multi-lobal fibers and which have a capacity for retaining particles of at least 10% greater than the capacity for retaining particles in comparable wipe materials that differs insofar as all the multi-lobal fiber is replaced with round fiber. Wipes of the invention can be used to clean wet or dry surfaces in a medical, industrial and/or clean room environment. The wipe materials are particularly useful as dusting wipes, but also can pick up other particles and detritus from surfaces. Wipe materials of embodiments of the invention can be used to reduce linting, for example, help keep cellulose-based materials from becoming airborne in a clean room environment. The wipe material can be used alone or in combination with one or more different or similar materials as a wipe article.

In yet another embodiment, a packaging material component is provided having at least one nonwoven spunmelt layer having an outer surface comprising at least one nonwoven polymer web having at least about 50% by weight substantially continuous multi-lobal fiber, wherein such packaging material has a stiffness performance in accordance with ASTM D5732-95 of at least 10% greater than a comparable packaging material component of similar overall construction that differs insofar as all the multi-lobal fiber of the nonwoven polymer web is replaced with round fiber. The packaging material component can be used with one or more different coatings or layers to provide a composite packaging material.

In another embodiment, a sound-absorbing material component is provided comprising at least one nonwoven polymer layer containing at least one web of at least about 50% by weight of substantially continuous multi-lobal fiber, wherein such article has an average acoustical absorption coefficient of at least 3% greater within the 2000 to 6000 Hz range, per ASTM E 1050-98, than a comparable sound-absorbing material component of similar overall construction that differs insofar as all the multi-lobal fiber of the nonwoven polymer web is replaced with round fiber. The sound-absorbing material component can be used in combination with one or more different layers as a sound-absorbent article.

Multi-lobal fibers included in materials of the invention can have a variety of numbers of deniers per filament ("dpf"), depending on the application, and webs included in materials of the invention generally can have a basis weight of at least about 6 grams per square meter (gsm) and can have a basis weight of as much as 100 grams per square meter, and the preferred ranges can vary depending on the application.

Multi-lobal fibers included in materials of the invention can include fibers with triangular, square, tri-lobal, tetra-lobal, penta-lobal and hexa-lobal or more cross-sections. The multi-lobal fibers in materials of the invention can be continuous or discontinuous, and have a variety of fibers having a variety of cross-section shapes and a variety of deniers per filament.

Materials of the invention can be up to and including 100% by weight of nonwoven multi-lobal fibers. Webs incorporated into materials of the invention can include a blend of multi-lobal fibers having similar or dissimilar polymeric compositions, similar or dissimilar cross-section shapes, and/or similar or dissimilar fiber diameters. In addition, the multi-lobal filaments can include one or more internal melt additives, such as an additive for enhancing softness.

Nonwoven materials and articles of the invention can include a single layer or multiple layers. In such an embodiment, a nonwoven article and/or material can include first and second outer layers of continuous filaments, wherein at least one layer includes at least one web having about 50% or more by weight of multi-lobal fibers. Multi-layer materials and/or articles of the invention can further include one or more inner layers of discontinuous fibers.

Preferably, nonwoven materials of the invention have at least three lobes, and they can contain more than one type of polymer. Materials of the invention can have 100% by weight multi-lobal fibers. Articles, such as protective fabrics can be made from materials of the invention. Protective fabrics of the invention can be used in barrier applications in the packaging, agricultural, and acoustical industries.

Nonwoven materials of the invention can have a basis weight of at least about 6 grams per square meter (gsm) and preferably, of at least about 8 gsm. Nonwoven barrier materials of the invention can have basis weights up to about 100 gsm, and the heavier basis weight materials of the invention can have basis weights of about 65 to about 100 gsm. Preferably, nonwoven materials of the invention include multi-lobal fibers having a dpf of at least about 0.8 and not greater than about 6. Most preferably, tri-lobal fibers are used in webs to be included in materials of the invention. Nonwoven materials of the invention can be made from fibers of a variety of types of polymers. Preferably, materials of the invention are made, for example, from polyolefins and/or polyesters. Useful polyolefins in materials of the invention include, but are not limited to, polyethylene, polypropylene and copolymers thereof.

Articles made from materials of the invention can include crop and tree covers, wipes, packaging materials, and materials useful in sound absorption systems.

Multi-lobal fibers can be made into webs to be included in materials of the invention by methods known in the art, such as extrusion, meltblowing, spunbonding, carding, air laying, wet laying. Webs included in materials of the invention can be stabilized by a variety of methods, including thermal, mechanical, chemical, and hydraulic bonding methods, such as hydraulic entanglement, needlepunching, and adhesive bonding. Most preferably, materials of the invention are made from spunmelt or spunbond webs and contain one or more of the following types of polymer fibers: polyethylene, polypropylene, polyester, co-polyester, polyamide, polylactic acid, and mixtures, co-polymers and blends thereof. Inner layers of materials of the invention can be made of absorbent materials, such as cotton, rayon, lyocell and mixtures thereof.

Other features and advantages of the present invention will become readily apparent from the following detailed description, the accompanying drawings, and the appended claims.

DEFINITIONS

Figure 1:
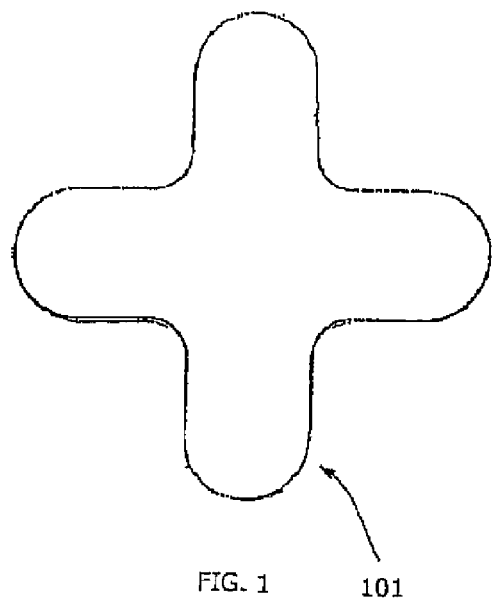
FIGS. 1-3 are exemplary embodiments of multi-lobal fibers suitable for use in materials of the present invention.
Figure 2:
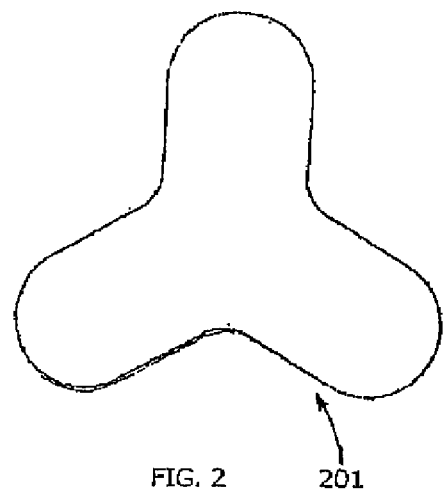
Figure 3:
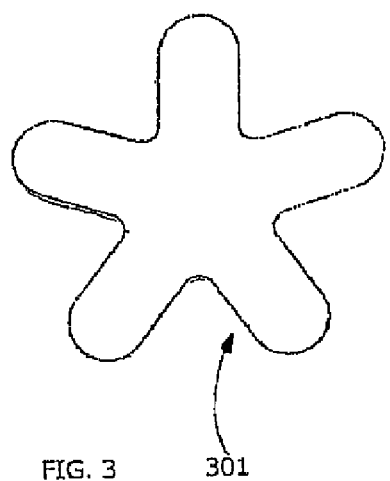
Figure 4:
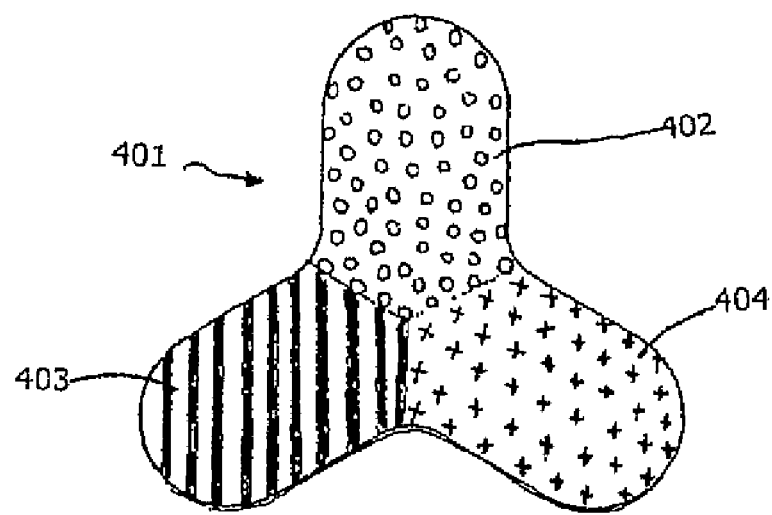
FIGS. 4-6 are exemplary embodiments of multi-lobal fibers comprising different side-by-side co-extruded materials suitable for use in materials of the present invention.
Figure 5:
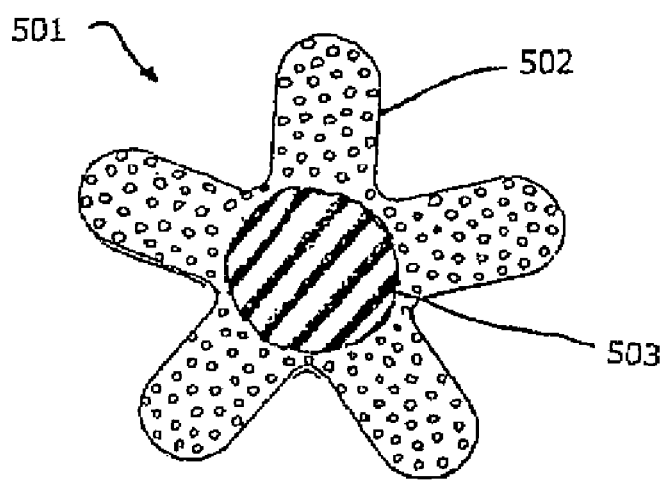

As used herein, the term "multi-lobal fiber(s)" refers to fibers or filaments having more than one critical point along the outer surface of the fiber. A critical point is defined as being a change in the absolute value of the slope of a line drawn perpendicular to the surface of the fiber when the fiber is cut perpendicular to the surface of the fiber axis. Multi-lobal fibers do not have round cross-sections.

As used herein the term "round fiber(s)" refers to fibers or filaments having a cross-section that is round or that is a circle in cross-section.

As used herein the term "breathable barrier material(s)" refers to a material through which air can pass but that protects items from various atmospheric contaminants or conditions.

As used herein, the term "nonwoven polymer web(s)" refers to a collection of nonwoven polymer fibers or filaments in close enough association to form one or more layers. The one or more layers of the web can include staple length fibers, substantially continuous or discontinuous filaments or fibers, and combinations or mixtures thereof. The web can be stabilized or unstabilized.

As used herein, the term, "spunmelt" refers to methods of producing nonwoven materials by extruding polymer into fibers or filaments and bonding the fibers or filaments thermally, chemically, or mechanically.

As used herein, the term "spinlace" refers to methods of producing nonwoven materials by extruding polymer into substantially continuous fibers or filaments and subjecting the fibers or filaments to hydraulic entanglement. The nonwoven made of substantially continuous fibers or filaments can have a degree of thermal bonding that range from unbonded to optimally bonded prior to be hydroentangled. Generally, various methods for producing nonwoven materials are described in U.S. Pat. No. 4,041,203 entitled, "Nonwoven Thermoplastic Fabric", which issued on Aug. 9, 1977, to inventors Brock et al. and in U.S. Pat. No. 3,849,241, entitled, "Nonwoven Mats By Meltblowing", issued on Nov. 19, 1974, to inventors Butin, et al., both of which are incorporated herein by reference.

As used herein, the term, "article" refers to any item that performs a function. Articles of the invention include, but are not limited to protective apparel, such as surgical gowns, drapes, scrubs, face masks, shoe covers, and other articles having protective or barrier functions, such as wipes, bags, covers, acoustical system components, and packaging as detailed more specifically below.

As used herein, "visible light" refers to the approximately 300-800 nm spectral wavelength range, unless indicated otherwise.

As used herein, the term, "imaging surface" refers to any surface for imparting raised profile elements into a nonwoven material. Suitable surfaces include, but are not limited to polymeric drums, perforated metal drums or sleeves, three-dimensional belts, and three-dimensional and/or perforated screens. U.S. Pat. No. RE38,505, entitled, "Nonwoven Fabrics Having Raised Portions", issued on Apr. 20, 2004 to inventors James, et al., describes one exemplary surface for imparting raised portions into nonwoven fabrics, and is hereby incorporated by reference

DETAILED DESCRIPTION

The present invention is directed toward nonwoven polymer materials including one or more webs, with at least one web having at least 50% by weight of multi-lobal fiber and are suitable for use in industrial, acoustical, packaging, clean room, and agricultural articles. Materials and articles of the invention have improved properties as measured by a variety of tests described herein. Articles of the invention can be made from one or more layers or components, but at least one of the components is or contains a nonwoven polymer material of the invention. Described herein in more detail is a definition of the terms, a description of multi-lobal fibers and webs useful to make materials of the invention, and a description of articles of the invention that can be made from materials of the invention.

Multi-Lobal Fibers and Webs

Multi-lobal fibers or filaments useful in materials of the invention, can include any spinnable synthetic or natural polymer. Preferably, multi-lobal fibers useful to make nonwoven materials of the invention, include, but are not limited to polyolefins, such as polypropylene and polyethylene, polyamides, polyesters, polylactic acid polymers, polyhydroxyalkanoate, polyvinyl alcohol, ethylene vinyl alcohol, polyacrylates, copolymers thereof, combinations thereof, and mixtures thereof. Most preferably, fibers that are polyolefins and polyesters are used in the nonwoven webs containing the multi-lobal fibers useful in the invention. Multi-lobal fibers useful in the materials and articles of the invention can include bi-component and multi-component polymers. For example, each lobe in a multi-lobal fiber included in materials and articles of the invention can have a similar or dissimilar polymeric composition, or each lobe of a multi-lobal fiber can be the same polymeric composition, and the most centrally located portion of the fiber or filament can be a dissimilar polymeric composition when compared to the lobe portion of the multi-lobal fiber.

The multi-lobal fibers or filaments useful in materials of the invention can further include one or more natural fibers or components that can be spun into fibers or filaments. Suitable natural fibers or components include, but are not limited to, components of or including regenerated cellulose, such as rayon and/or lyocell. Further, multi-lobal fibers that possess a cationic charge can also be included in nonwoven materials of the invention. Chitin is one example of a cationic fiber. Cationic fiber is further described in United States Published Application No. 2006/0013848, entitled, "Polymer With Positive Charges and the Method for Forming the Same", which published on Jan. 19, 2006 to inventor Lin and is hereby incorporated by reference. In addition, the present invention contemplates use of multi-lobal filaments or fibers in a material with other fibers or filaments that can or can not have a multi-lobal cross section, such as but not limited to, olefinic elastomeric polymers and other specialty elastomers. Such elastomeric polymers include, but are not limited to P-E elastomers, which typically include at least about 70 mole percent of an isotactic propylene. Vistamaxx® is an exemplarily specialty elastomer and is a trademark of ExxonMobil Chemical.

The nonwoven materials of the present invention can include one or more webs containing filaments or fibers that are either substantially continuous or discontinuous. Either or both of the multi-lobal and non-multi-lobal fibers included in materials of the invention can be continuous or discontinuous. Filaments or fibers useful in the invention can be formed by a spunmelt process. The spunmelt process entails extruding molten polymer under pressure through a large number of orifices in a plate known as a spinneret or die. The resulting substantially continuous fibers or filaments are quenched and drawn by any of a number of methods, such as slot draw systems, attenuator guns, Godet rolls, or a slot push system, which is exemplified by a Reifenhauser system. These fibers or filaments can be collected as a loose web on a moving foraminous surface, such as a wire mesh conveyor belt or can be bundled and incorporated into a yarn, which can be used in whole or in part as yarns of a material of fabric. When more than one extruder is in line for the purpose of forming a multi-layered material or fabric, typically, the subsequent webs are collected upon the topmost surface of the previously formed web. The web is then typically consolidated or stabilized by some means. One method can involve heat and pressure, most preferably, thermal point bonding is used in materials of the present invention, other methods can include chemical bonding, needling or hydraulic entanglement.

Discontinuous filaments can be formed by a meltblown process. In a standard meltblown process molten polymer is extruded under pressure through orifices in a spinneret or die. High velocity air impinges upon the filaments or fibers as they exit the die, and the polymer stream is usually rapidly quenched and attenuated. The energy of this step is such that the formed filaments or fibers are greatly reduced in diameter and are fractured that fibers of various lengths are produced. This differs from the spunbond process where the continuity of the filaments or fibers is typically preserved. Discontinuous filaments formed by the meltblown process tend to have a diameter of less than 10 microns and can have a diameter of less than 5 microns.

Multi-lobal continuous filaments useful in materials of the present invention typically have a diameter of about 10 to about 200 microns, preferably from about 10 to about 100 microns, and more preferably from about 10 to about 30 microns. Discontinuous filaments or fibers, including but not limited to, meltblown filaments and micro-fibers, can also be included in one or more layers of webs included in materials of the present invention. Typically, meltblown discontinuous fibers or filaments have on average fiber diameters smaller than about 10 microns. Preferably, discontinuous meltblown fibers useful in the present invention have an average diameter of about 0.5 to about 10 microns, and more preferably of or about 0.5 to about 3 microns. Micro-fibers useful in materials of the invention, typically, have average fiber diameters less than discontinuous meltblown filaments, which tends to be less than about 0.5 microns.

Referring to FIGS. 1-3 and FIGS. 4-5, therein are illustrated cross-sections of representative embodiments of multi-lobal fibers 101, 201, 301, 401, and 501 suitable for use in the present invention. Fibers with a triangular shaped, square shaped, and other geometrically-shaped cross-sections that are not round are also suitable for use in materials of the present invention. The shading in the embodiments represented in FIGS. 4-5 indicates that dissimilar types of polymers 402, 403 and 404, and 502 and 503, respectively, can be co-extruded and used to create multi-lobal fibers that are useful in materials of the present invention. Methods for co-extruding side-by-side or sheath-core multi-lobal fibers are described, for example, in U.S. Pat. No. 6,815,383, US 2006/0012072, and US 2003/0049988, which descriptions are incorporated herein by reference.

Optionally, other ingredients or additives can be incorporated into materials of the invention. Suitable additives include, but are not limited to, pigments, aromatics, antimicrobials, fire retardants, thermochromics, fluoro-chemistries, softness additives, and the combinations thereof. A particularly preferred softness additive and other additives useful in materials of the invention are disclosed in commonly owned U.S. Pat. No. 6,740,609, entitled, "Soft Polypropylene Melt Spun Nonwoven Fabric", to inventors Peng, et al., issued on May 25, 2004, which is hereby incorporated by reference.

The optional additives can further be used to modify the processability and/or to modify physical properties such as opacity, tensile strength, wet strength, and modulus of the final material or article of the invention. Optional additives can offer other benefits to materials of the invention including, but not limited to, stability, including oxidative stability, brightness, color, flexibility, resiliency, workability, processing aids, and viscosity modifiers. Further examples of optional additives to materials of the invention include, but are not limited to, titanium dioxide, calcium carbonate, colored pigments, and combinations thereof. Further additives including, but not limited to, inorganic fillers such as the oxides of magnesium, aluminum, silicon, and titanium can be added to materials of the invention as inexpensive fillers or processing aides.

According to the present invention, a nonwoven material is produced that includes at least one layer having at least one web including at least about 50% or more by weight of a multi-lobal fiber. Preferably, nonwoven materials of the invention include at least one web having at least about 50% or more by weight of a tri-lobal fiber. Fiber or filaments having a multi-lobal cross section have more than one critical point along the outer surface of the fiber. Multi-lobal fibers or filaments useful in materials of the present invention will more preferably have three or more lobes. Any fiber content of materials of the invention that is not multi-lobal, can include fibers with dissimilar cross sections, such as but not limited to, round fibers that are filled or hollow in the center. Whether or not they are multi-lobal, fibers or filaments that are useful in materials of the invention can be hollow or filled.

In one preferred embodiment of the invention, nonwoven materials of the invention include a single continuous fiber or filament web, wherein the web further includes about 100% by weight of multi-lobal filaments or fibers. Preferably, the web is about 100% by weight of multi-lobal filaments or fibers having at least three lobes. The web can optionally include a blend of multi-lobal filaments having similar or dissimilar polymeric compositions, as well as similar or dissimilar fiber diameters and cross-sections. In addition, multi-lobal filaments included in materials of the invention can include one or more internal melt additives, such as an additive for enhancing softness.

In yet another preferred embodiment of the invention, nonwoven materials of the invention include a layer of multiple webs. In such an embodiment, nonwoven materials of the invention can include first and second outer layers, wherein at least one layer includes at least one web having about 50% by weight of multi-lobal filaments or fibers. More preferably, fibers or filaments included in the outer layers of this preferred embodiment are continuous. Multi-layer materials of the invention can further include one or more inner layers, and more preferably, at least one of the inner layers includes discontinuous filaments or fibers. Discontinuous filaments or fibers typically include meltblown filaments or fibers that have on average a fiber diameter of less than about 10 microns, and discontinuous filaments or fibers useful in materials of the invention can be micro-fibers, which typically have a fiber diameter of less than about 0.5 microns.

Multi-layer materials of the invention can include fibers or filaments that are meltblown (M), and/or spunbond (S) and included in materials of the invention that are laminates. Other suitable laminates include, but are not limited to, SMMS, SS, spunbond/carded staple fiber/spunbond, and spunbond/micro-fiber/spunbond. Additional layers can be included in materials of the invention that are devoid of multi-lobal fibers or filaments and fibers for these additional layers can be selected from any fiber suitable for the end use application of the material. One or more film layers can further be included in the nonwoven materials and articles of the present invention. Suitable films include cast films and extruded films and can further be selected from microporous films, monolithic films, and reticulated films.

In accordance with the teachings of the present invention, the one or more layers including at least one web having at least about 50% by weight of multi-lobal fibers can be preformed. The preformed materials can be positioned in a face-to-face relationship with additional preformed layers to be subsequently bonded. In the alternative, one or more webs included in materials of the invention can be preformed and unwound, to receive one or more subsequent layers that are extruded directly onto a preformed layer. In yet another alternative, the one or more webs can be entirely formed in an inline process and subsequently bonded.

The nonwoven materials included in the nonwoven articles of the present invention can be bonded by any method useful for a particular application. The web can be stabilized by bonding using any method known in the art, including, but not limited to thermal bonding, mechanical bonding, hydraulic entanglement, chemical or adhesive bonding, and needling. Suitable methods include, but are not limited, using air in a thermal bonding process, calendering, and/or ultrasonic bonding. In addition, nonwoven materials of the invention can be mechanically bonded, such as by needle punching, hydraulically entangled, chemically bonded, or adhesively bonded. Further still, a combination of bonding techniques can be utilized on materials of the invention. For example, material layers can be first lightly thermally bonded, so as to impart a first degree of integrity to the layers, and then subsequently bonded using hydroentanglement to further enhance the tensile strength of layers.

Optionally, one or more layers within nonwoven materials of the invention can include one or more raised profile portions or elements. The raised profile elements can include regular and irregular patterns, such as, but not limited to, characters, animal shapes, company logos, and combinations thereof. The profile elements can be embossed into the fabric or imparted by using an imaging surface. Preferably, a nonwoven material of the invention is given one or more raised profile elements using hydroentanglement. However, it has been further contemplated that one or more raised profiles can be imparted to materials of the invention by an imaging surface through the use of heat and an optional suction device.

Materials and Articles

Nonwoven materials of the invention can be used to make articles of the present invention that include one or more layers including one or more webs having at least about 50% by weight of multi-lobal fibers or filaments. Further, articles of the invention can include one or more layers including one or more webs of up to about 100% by weight multi-lobal fibers or filaments. In one embodiment, articles of the present invention include one or more layers having at least one web of at least about 50% by weight tri-lobal fibers or filaments.

Materials of the invention can be used to make articles useful for industrial applications, such as wiping in clean room, food service, and graphic arts applications. Most preferably, articles of the invention would be particularly suitable for a clean room wipe when a substantially continuous web containing at least 50% by weight of multi-lobal fiber is included in an outside layer of the material used to make the article. Typically, continuous filaments have low linting characteristics, which is an important attribute for a wipe useful in a clean room environment. In general, webs of substantially continuous round filaments are less preferred due to an inferior ability to capture and retain particulates within a wipe. It is believed that industrial wipes including at least one layer of at least one web of at least 50% by weight of multi-lobal fibers or filaments provides an enhanced liquid and dry particulate pick-up and containment performance when compared with articles, such as wipes, that do not contain such an amount of multi-lobal filaments or fibers.

One example of a suitable industrial wipe of the invention includes a single layer made of a single web of nonwoven material of the invention containing at least 50% by weight of multi-lobal fiber or filaments of polyester or polypropylene and can be optionally treated with a surfactant depending upon whether the wipe can be used on dry or wet surfaces. Useful weights for such a layer can be at least about 15 gsm to about 100 gsm. More particularly, basis weights for such a layer in a wipe useful for industrial purposes can be generally at least about 30 gsm and not greater than about 90 gsm, even more particularly at least about 30 gsm and no greater than about 75 gsm, and most particularly, at least about 30 gsm and no greater than about 60 gsm. Filaments suitable for use with the nonwoven wipe material are preferably about 1 dpf to about 20 dpf, more preferably, about 1 dpf to about 10 dpf, and most preferably about 1 dpf to about 5 dpf.

Another example of an industrial wipe of the invention can be an article including two outer layers including webs of substantially continuous filaments having at least about 50% by weight of multi-lobal filaments. The article can include an inner layer of absorbent material, including, but not limited to cotton, wood fibers, lyocell, other cellulose-based materials, or webs that are meltblown or made of micro-fibers of such materials. Such articles of the invention, (e.g., wipes) can be bonded to keep materials from the inner layer from contaminating the area or the surface being wiped. Typical basis weights for such outer layers can be at least about 6 gsm and no greater than about 100 gsm, more particularly about 8 gsm and no greater than about 50 gsm, and most particularly about 8 gsm and no greater than about 35 gsm.

Another example of an industrial wipe of the invention can include one or more layers containing staple fibers that are at least about 50% by weight multi-lobal fibers, and the article can include at least 5% by weight of a cationic fiber. Such an article of the invention is particularly suited for food service wipes, wherein the wipe comes in direct contact with chlorinated or quaternary amine based disinfectant solutions.

Optionally, industrial wipe articles of the invention can include one or more layers of one or more webs of at least 50% by weight multi-lobal fibers, and additives such as tackifiers or surfactants, that can enhance the capture and containment of liquids or particles. Further, industrial wipes of the present invention can include other active ingredients, such as antimicrobials, antifungals, antistatics or any active ingredient that imparts to materials or articles of the invention one or more desirable functionalities.

Articles that are wipes of the present invention have improved particle retention capacity when compared to wipes of similar chemical composition, overall construction, and number of denier per filament but containing round filaments or fibers in place of all multi-lobal filaments or fibers. This improved particle retention capacity can be described as a better ability to capture and retain fine particles of dirt or other contaminants. A suitable method for measuring particulate retention capacity includes the use of a standard contaminant, which is spread over a surface and wiped; and then the wipe is tested for the amount of contaminant picked-up.

Figures 6, 7:
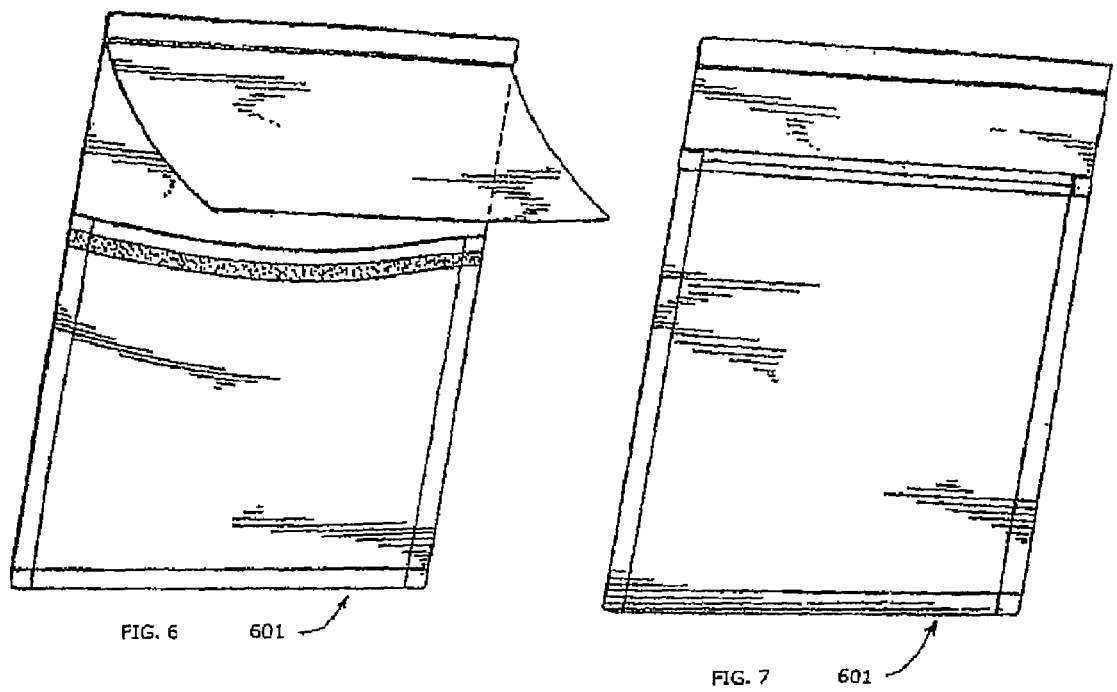
FIG. 7 is an illustrative embodiment of a packaging article that is representative of a nonwoven article of the present invention.

A further embodiment of the invention includes materials useful for packaging articles, wherein the material or article includes at least one or more layers of one or more webs having at least about 50% by weight of multi-lobal fibers or filaments. A mailing envelope is exemplary of a packaging article that can be made using materials of the invention, and one such embodiment is illustrated in FIGS. 6 and 7, wherein FIG. 6 shows the envelope 601 with the flap open, and, in FIG. 7, with the flap closed. The nonwoven materials of the invention can be flattened into a substantially paper-like substrate providing enhanced rigidity and pleatability typically necessary to facilitate conversion of nonwoven materials into packaging material. The multi-lobal fibers or filaments included in the one or more webs included in materials of the invention contribute to enhance opacity, reception of ink and/or adhesive, and rigidity of the packaging materials of the invention. The improved stiffness of materials of the invention can be measured by test methods IST 90.1 or ASTM D 5732-95, which are incorporated herein by reference and are described as a "Standard Test Method for Stiffness of Nonwoven Fabric Using the Cantilever Test". Materials of the invention have an improved stiffness when measured in accordance with one of these tests that is at least 10%, and preferably at least 15%, greater than the stiffness of a material of the same chemical composition, overall construction (e.g., basis weight), a number of denier per filament but having round fiber in place of all the multi-lobal fiber. Suitable basis weights for such a multi-lobal fiber containing nonwoven layer component of a packaging material can be generally at least about 15 gsm and not greater than about 100 gsm, more particularly at least about 30 gsm and no greater than about 100 gsm, and most particularly at least about 50 gsm and no greater than about 100 gsm. Filaments suitable for use with the nonwoven packaging material are preferably about 1 dpf to about 20 dpf, more preferably, about 1 dpf to about 10 dpf, and most preferably about 1 dpf to about 5 dpf.

Non-limiting examples of nonwoven materials for use in a packaging article of the invention would include a nonwoven material containing bi-component fibers or filaments that are thermally bonded under pressure, so as to form a nonwoven material that is thoroughly bonded. Another example includes a nonwoven material of the invention having high melting point fibers or filaments and low melting point fibers or filaments. The low melt filaments or fibers tend to form bonds with the other fibers or filaments when thermally activated, and if thermal bonding is conducted while a web is compressed, a dense structure can be formed.

Figure 8:
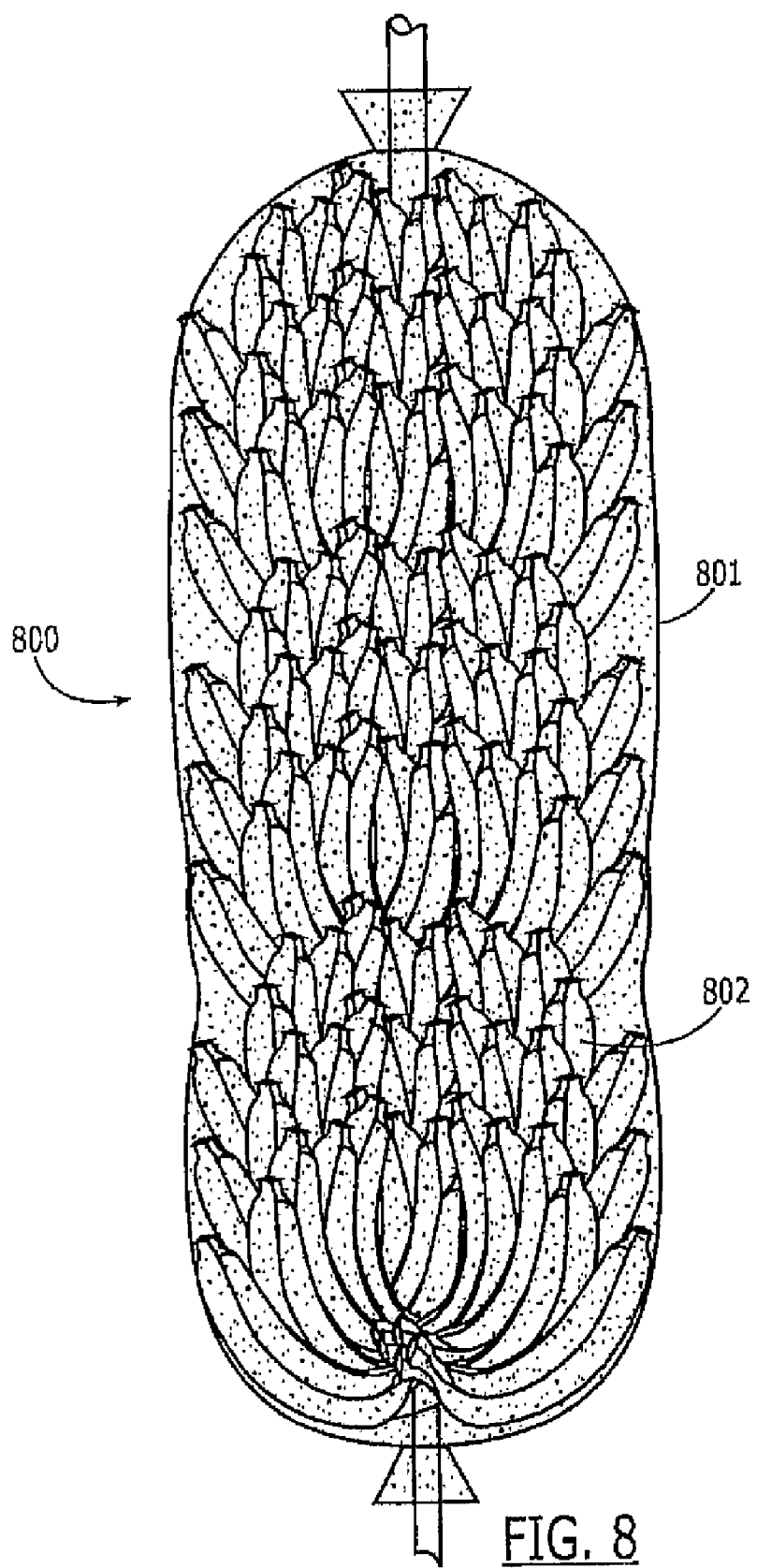
FIG. 8 is an illustrative embodiment of an agricultural cover that is representative of a nonwoven article of the present invention.

A further embodiment of the invention is an article useful in agricultural applications, wherein the article includes one or more webs having at least of about 50% by weight of multi-lobal fibers. FIG. 8 is an illustrative embodiment of a protective wrap that is made using a breathable barrier material of the invention and is useful to protect crops, fruits and/or vegetables from damage caused by frost and insects, for example. In FIG. 8, an article 800 comprises a cluster of fruit 802, such as bananas, covered by a breathable nonwoven material 801 according to an embodiment of the present invention. While not intending to be bound by theory, it is believed that the positive impact on the growth of plants or the ripening of fruits or vegetables that are protected by breathable barrier materials and articles made therefrom of the invention is due to the quality of light that can or can not pass through the agricultural protective wrap. While not intending to be bound by theory, the use of multi-lobal fibers or filaments as described herein in protective agricultural wraps is believed to improve the diffusion of light, creating more uniform lighting of crops, fruits, or vegetables. Further, damage to the fruit, vegetable, or plant caused by excessive direct sunlight exposure can be reduced when protected by articles made from materials of the present invention rather than articles of the same chemical composition, overall construct, and number of denier per filament, basis weight, but containing round filaments or fibers in place of all the multi-lobal filaments or fibers. It is believed that damage to fruit, vegetable, or plants is caused by direct sunlight exposure. A method to assess the ability of a fabric to offer protection is to measure the percentage of light transmittance over the visible and near visible range of wavelengths (300-800 nm). For purposes herein, the "visible light" range encompasses about 300 to about 800 nm. More precisely, the material of this invention reduces visible light transmittance preferably by at least about 10%, and no more than 65% when compared to material of same chemical composition, overall construct, and number of denier per filament, but containing round filaments or fibers in place of all the multi-lobal filaments or fibers.

Certain plants grown under articles of the invention made from materials of the present invention tend to have an increased yield (i.e., in growth) when compared to the same plants grown under the same conditions under articles having the same chemical composition, overall construction, and number of denier per filament with all the multi-lobal fiber being replaced with round fiber in the article. One way to measure the benefit of this invention is to compare the yield of plants grown while protected by articles made from the materials of this invention to the same plants protected by articles of the same chemical composition, overall construct, and number of denier per filament, but containing round filaments or fibers in place of all the multi-lobal filaments or fibers. A gain of at least about 5% and preferably of at least about 10% in growth as quantified in the plant's yield is expected for plants protected by articles of the invention containing materials of the invention when compared to articles having the same chemical composition, overall construction, and numbers of denier per filament but containing round fibers or filaments in place of all the multi-lobal fiber. Plants grown under articles made from materials of the invention when compared to plants grown under articles of the same chemical composition, overall construction, and numbers of denier per filament but having round fibers in place of all the multi-lobal fibers tend to have increased color uniformity as measured by: selecting mature fruits or vegetables grown under the protection of articles made from materials of this invention and the same type of mature fruits or vegetables grown under the protection of an article having the same chemical composition, overall construction, and number of denier per filament but having all the multi-lobal filaments or fibers replaced with round filaments; taking color measurements in at least three positions equally distant around the fruit or vegetable chosen using typical color measurement equipment; averaging each color measurement reading; and calculating a standard variation. The use of articles made using materials of the invention should reduce the color variability or standard variation of the color measurements by at least about 10% and preferably by at least about 15%.

Agricultural wraps made from materials of the invention can be in the form of bags or covers and can be useful for crops, fruits, or vegetables that grow on land or in trees. Agricultural wraps of the invention can be useful to protect bananas during their growth and ripening period. Such a wrap can be in the form of a cover or bag, and can be made from a nonwoven material of the invention that is made using a spunbond process that is further described in co-pending United Stated Published Application No. 2004/0062892, entitled, "Protective Cover for Agricultural Products", published Apr. 1, 2004, to inventors Vasquez et al. In addition to assisting with even ripening, the purpose of the bag or cover is to protect crops, fruits, or vegetables from insects, frost, and other potentially damaging environmental factors that could affect the quality of the fruits, vegetables or crops, including but not limited to their appearance. Typically, such agricultural covers or bags of the invention made from spunbond nonwoven materials of the invention have a basis weight of at least about 8 gsm and not greater than about 60 gsm, more particularly at least about 10 gsm and not greater than about 40 gsm, and most particularly, at least about 15 gsm and not greater than about 35 gsm. Filaments suitable for use with the nonwoven agricultural material are preferably about 1 dpf to about 10 dpf, more preferably, about 1 dpf to about 5 dpf, and most preferably about 1 dpf to about 3 dpf.

Figure 9:
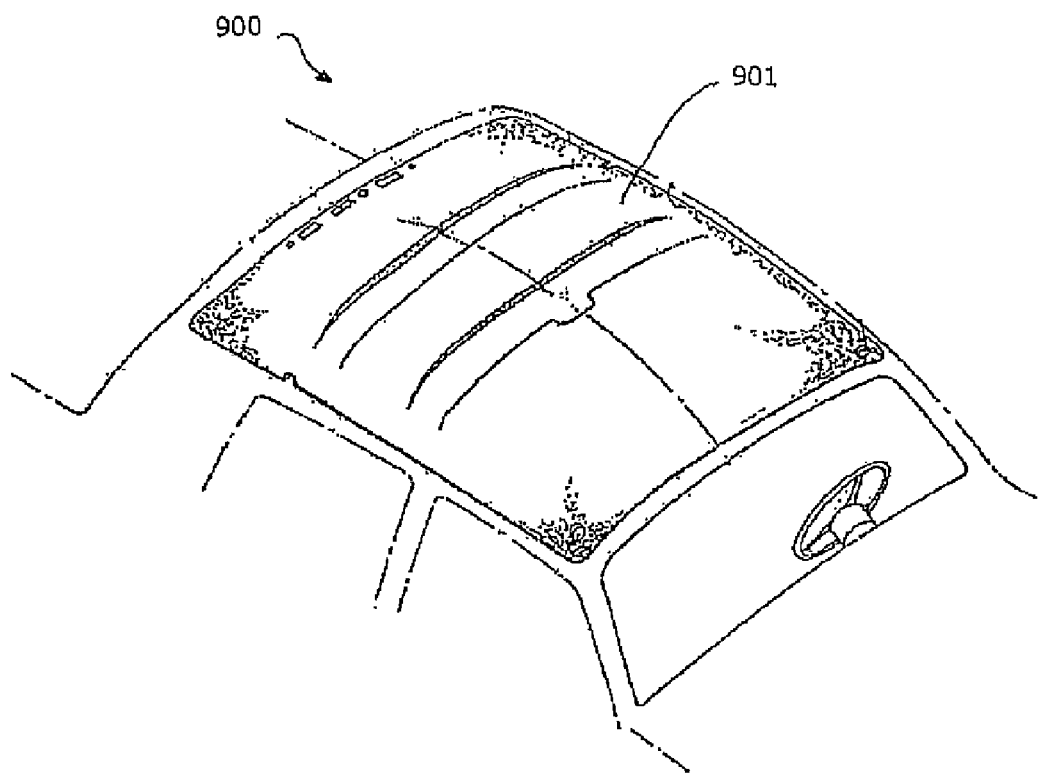
FIG. 9 is an illustrative embodiment of an acoustical panel that is representative of a nonwoven article of the present invention.

Articles useful in acoustical applications can also be made using nonwoven materials of the invention, wherein the nonwoven material is used as a component of a multi-layer acoustical composite. Such acoustical applications include, but are not limited to, materials used in systems for dampening the noise of appliances or other machinery or equipment, and systems for absorbing soundwaves to control the acoustics in a symphony hall or automobile, for example. FIG. 9 is an illustrative embodiment of an acoustical article 901 used as an automotive interior panel, such as a headliner, in an automobile 900, wherein, according to the present invention, the acoustical panel 901 includes one or more layers of at least about 50% by weight multi-lobal fibers or filaments in one or more webs of materials of the invention. In some instances, it can be desirable to use different types and/or sizes of fibers in different layers. For example, a nonwoven fabric can be produced including a blend of binder fibers and multi-lobal fibers, which is thermally bonded to activate the binder fiber forming point-to-point bonds with the multi-lobal fiber. Additionally, materials of the invention can be useful in acoustical composites, wherein the materials are compressed into a semi-rigid construct for use as acoustical panels. One method of making acoustical panels is described in co-pending United States Published Patent Application 2002/0137421, entitled, "Method for Controlling Thermohysteresis during Thermoforming of Three-dimensional Fibrous Compound Constructs and the Product thereof", which was published on Sep. 26, 2002, to inventors Desroches, et al., which is hereby incorporated by reference. Not intended to be bound by theory, it is believed that multi-lobal fibers provide for a higher air void volume in nonwoven materials of the invention, thereby enhancing the acoustical or sound absorption characteristics and capabilities of articles made from these materials, such as panels. Suitable basis weights for such a multi-lobal fiber containing nonwoven layer component of an acoustic article can be generally at least about 12 gsm and not greater than about 100 gsm, more particularly, at least about 12 gsm and no greater than about 50 gsm, and most particularly, at least about 12 gsm and no greater than about 30 gsm. Filaments suitable for use with the nonwoven acoustical material are preferably about 1 dpf to about 20 dpf, more preferably, about 1 dpf to about 10 dpf, and most preferably about 1 dpf to about 5 dpf.

An embodiment of the invention includes a nonwoven material having at least one layer, including at least one web made of 50% by weight or more of substantially continuous multi-lobal filaments or fibers wherein the material exhibits an improved sound absorption performance preferably by at least about 3%, more preferably by at least about 5%, and most preferably by at least about 7%, when compared to a nonwoven material of similar composition and construct where all the multi-lobal fibers or filaments are replaced by round fibers or filament. To show such an improvement the acoustic adsorption coefficient of various samples can be measured by the impedance tube test method ASTM E 1050-98.

EXAMPLES

Nonwoven materials containing multi-lobal fiber and articles incorporating them were prepared in the following manners. All samples of spunbond were produced at the Nonwoven Cooperative Research Center (NCRC), a facility located at North Carolina State University in Raleigh, N.C., on a single-beam spunbond pilot line approximately 0.5 meter wide. The NCRC spunbond pilot line is designed in accordance with the general principles applied to commercial spunbond equipment offered by Hills, Inc. or Neumag.

Specific design characteristics of the spunbond pilot line equipment include an open spinning system, which refers to the extrusion of filaments in a quench zone that is open to atmospheric pressure, a draw slot system, and a system that allows for adjustable distances between the spinneret and draw slot, as well as between the draw slot and collection belt.

The process of producing all samples included, feeding a polymer blend to the extruders using a volumetric blender, melting and mixing the polymer blend in the extruders, metering the flow of the melted polymer blend to the spinneret with gear pumps, extruding the blend through the holes of the spinnerets to form filaments, quenching the filaments with the cross flow of cold air, applying a draw force to the filaments using a draw slot system, collecting the drawn filaments on a moving belt to form a web, stabilizing or bonding the web by passing it between two heated rolls of a calender, wherein one heated roll had a raised surface and the other roll a smooth surface, and winding the bonded web onto a roll.

Additional samples were made by blowing meltblown fibers onto selected spunbond made from tri-lobal or round filaments previously made at NCRC. The application of the meltblown was also carried on NCRC pilot line using their meltblown beam. The samples of spunbond used for those composites were just slightly thermally bonded. In a subsequent step, two identical meltblown (M)/spunbond (S) composites were thermal bonded together with the meltblown sides facing each others. The thermal bonding was accomplished by passing the composite layers in a hot calender comprising an embossed roll with a raised pattern and a smooth roll, both being heated and kept together by applying pressure. The resulting samples had four (4) layers, two outer layers of spunbond filaments and two inner layers of meltblown fibers. This approach was used to model commercially available fabrics used as a component of an acoustical insulation system.

Example 1

Samples A1-A4 were produced using a homogeneous polymer blend consisting of 99.3% polypropylene of Exxon grade 3155 and 0.7% of Standridge Color Corporation (SCC) white concentrate no. 20790. SCC white concentrate no. 20790 includes about 70% titanium dioxide. All of Example 1 samples were produced of 100% monocomponent tri-lobal filaments. The spinneret used to produce the tri-lobal filaments had about 2222 holes. Samples A1-A4 only differed by way of basis weight and bonding conditions, as outlined in Table 1.

Process conditions for all Example 1 samples were as follows: throughput: about 0.3 grams per hole per minute (g/hole/min); polymer melt temperature: about 220-225° C. in the extrude; die temperature: about 230-235° C. (these temperatures are typical for processing spunbond from 35 melt flow rate (MFR) polypropylene); quench air: adjusted to stabilize spinning process; air pressure to draw slot: about 10 psi of pressure was used to produce filaments with desired denier per filament (dpf); quench distance: the quench distance is the distance measured from the spinneret to the draw slot, which was measured at about 0.91 meters; forming distance: the forming distance is the distance measured from the draw slot to the collection belt, which was measured at about 0.38 meters; belt speed: belt speed was adjusted to produce spunbond webs at various basis weights.

Example 2

Samples B1-B4 were produced using the same equipment, homogeneous polymer blend, and approximately the same process conditions as used in Example 1. All of Example 2 samples were produced of 100% monocomponent round filaments. The spinneret used to produce the round filaments also had about 2222 holes. Sample basis weights and bonding conditions for samples B1-B4 can be found in Table 1.

Example 3

Samples C1-C3 were produced using the same equipment and tri-lobal spinneret as used in Example 1. The polymer blend utilized for producing the tri-lobal filaments of samples C1-C3 consisted of 93% Exxon polypropylene grade 3155 and 7% of SCC white concentrate no. 20790.

The process conditions were the same as used in Example 1, with the following exceptions: die temperature: about 235-245° C.; air pressure to draw slot: about 15 psi of pressure was used to produce finer filaments. The basis weights and bonding conditions for samples C1-C3 can be found on Table 1.

Example 4

Samples D1-D3 were produced using the same equipment, the same homogeneous polymer blend, and approximately the same process conditions as used in samples C1-C3. All of Example 4 samples were produced of 100% monocomponent round filaments.

The process conditions were the same as used in Example 3, with the following exceptions: air pressure to draw slot: about 18 psi of pressure; quench distance: varied between about 0.86-0.91 meters; forming distance: varied between about 0.38-0.43 meters. Basis weights and bonding conditions for samples D1-D3 can be found in Table 1.

Example 5

Samples E1 and E2 are composite samples of spunbond (S) and meltblown (M) layers. The spunbond layers were made of tri-lobal filaments that were lightly bonded and produced using the same spinning process conditions of Example 1. The bonding conditions for samples E1 and E2 were such that the surface of the calender roll was at 112° C. and the pressure was 380 N/cm. Samples E1 and E2 were both S/M/M/S composites. Sample E1 was made by applying an 8 gsm meltblown layer onto two separate 15 gsm spunbond layers to make two S/M composite webs, which are subsequently thermally bonded. Sample E2 was the same S/M/M/S composite as E1, except the weight of each meltblown layer was reduced to 4 gsm.

Example 6

Sample F is also a composite sample of S/M/M/S. The spunbond layers were made of tri-lobal filaments that were lightly bonded and produced using the same process conditions of Example 3. The bonding conditions of sample F were such that the surface of the calender roll was at 114° C. and the pressure was 714 N/cm. Sample F was made by applying a 4 gsm meltblown layer onto two separate 15 gsm spunbond layers to form two S/M composite webs, which were subsequently thermally bonded to produce an S/M/M/S composite web.

Example 7

Samples G1 and G2 are composite samples of S/M/M/S as well. The spunbond layers were made of round filaments that were lightly bonded and produced using the same process conditions of Example 2. The bonding conditions of samples G1 and G2 were such that the surface of the calender roll was at 112° C. and the pressure was 380 N/cm. For sample G1 a layer of 8 gsm was applied to the spunbond. Sample G1 was made by applying an 8 gsm meltblown layer onto two separate 15 gsm spunbond layers to form two S/M composite webs, which were subsequently thermally bonded to produce an S/M/M/S composite web. Sample G2 was the same S/M/M/S composite as G1, except the weight of each meltblown layer was reduced to 4 gsm.

TABLE 1

| Sample ID | Filament Shape | Target Basis Weight (gsm) | Calender Surface Temperature (° C.) | Calender Pressure (N/cm) |
| --- | --- | --- | --- | --- |
| A1 | Tri-lobal | 15 | 139 | 710 |
| A2 | Tri-lobal | 34 | 151 | 710 |
| A3 | Tri-lobal | 68 | 151 | 950 |
| A4 | Tri-lobal | 90 | 151 | 950 |
| B1 | Round | 15 | 139 | 710 |
| B2 | Round | 34 | 140 | 710 |
| B3 | Round | 68 | 140 | 950 |
| B4 | Round | 90 | 140 | 950 |
| C1 | Tri-lobal | 15 | 132 | 710 |
| C2 | Tri-lobal | 34 | 141 | 710 |
| C3 | Tri-lobal | 15 | 136 | 710 |
| D1 | Round | 15 | 132 | 710 |
| D2 | Round | 34 | 141 | 710 |
| D3 | Round | 15 | 136 | 710 |

Test Methods and Test Results. Dry dust pick-up was evaluated in the following manner. Samples made in accordance with Examples 1, 2, 3, and 4 were tested for dust pick-up. The equipment and procedure is used to simulate dry wiping of a hard surface. The results of the test are reported in Table 2.

Figure 11:
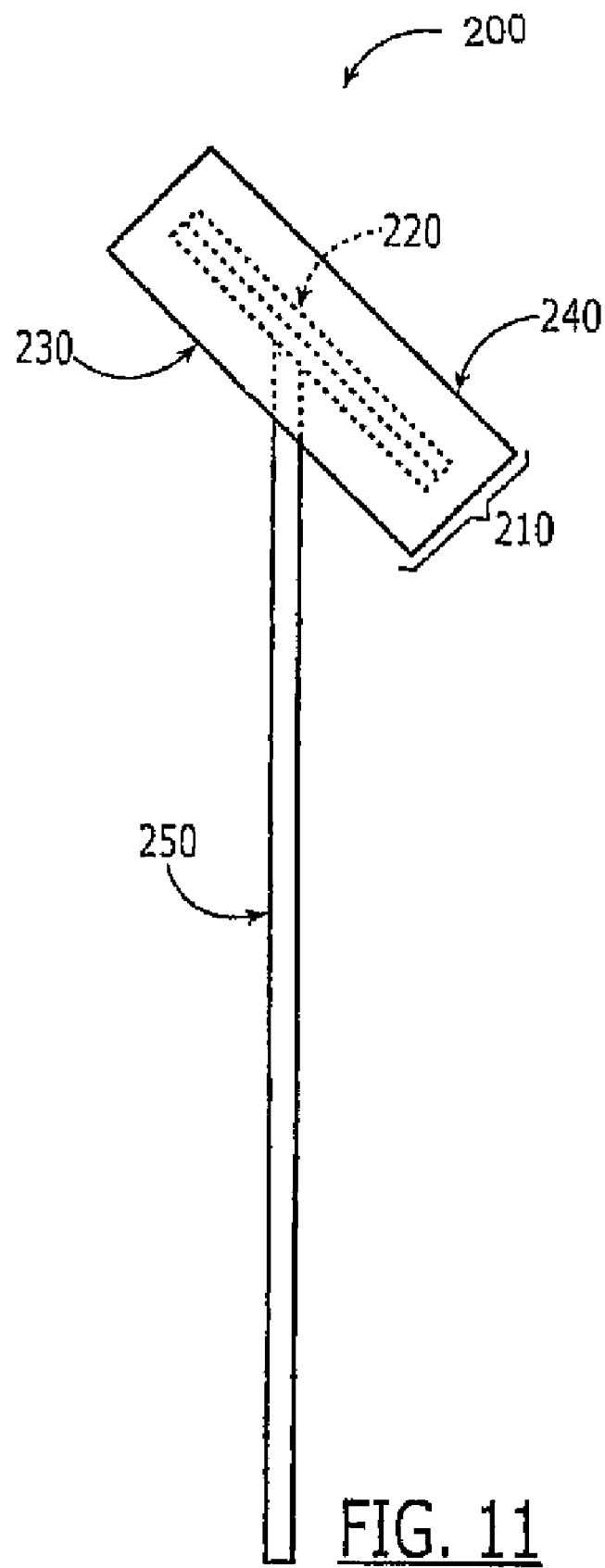
FIG. 11 is representative of the equipment utilized to test for dry wiping properties of a nonwoven article of the present invention.
Figure 12:
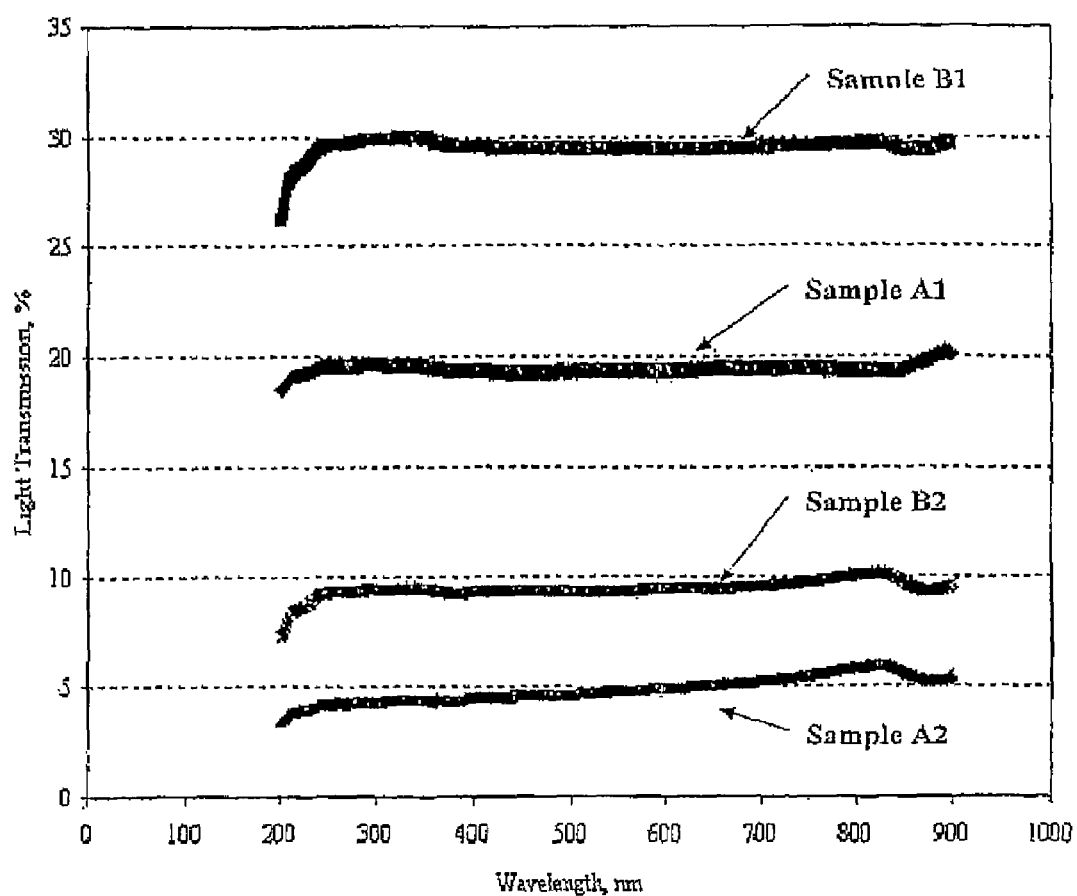
FIG. 12 is a graph of light transmittance over a range of wavelength for several spunbond samples including or not including multi-lobal filaments.

With reference to FIG. 11, the equipment used for the dust pick up test included a dry swivel sweeper 200 having a sweeper head mounted at one end of a handle 250, such as a Procter and Gamble Company Swiffer® Sweeper including the sweeper starter kit [Part No. 95642127]. The sweeper was fitted with test wipes 210 cut to dimensions suitable to be used with the swivel sweeper head 220.

Figure 10:
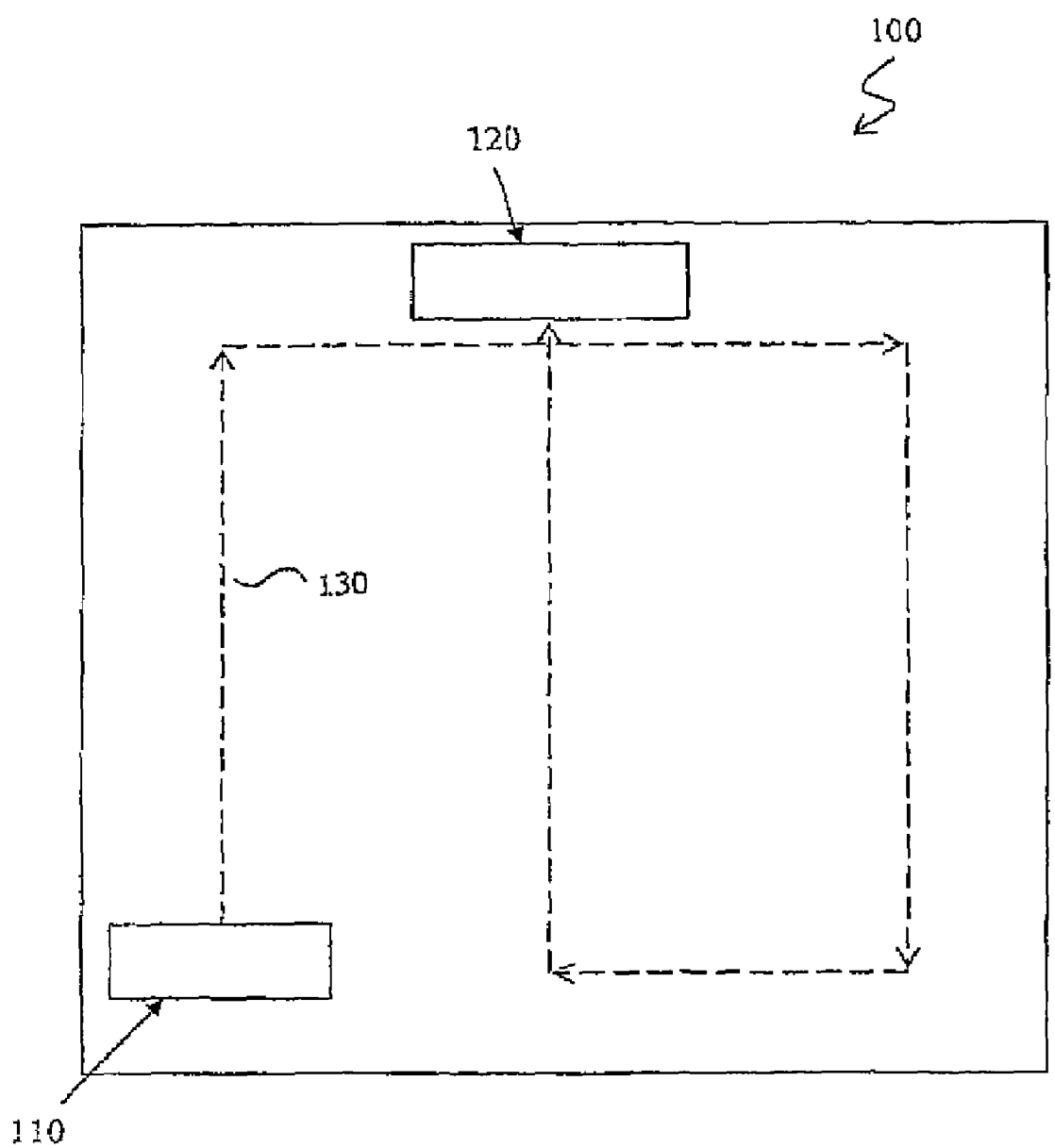
FIG. 10 is a diagram illustrating the wiping pattern used to test for dry wiping properties of a nonwoven article of the present invention.

As a standard testing dust, a 50:50 blend of ISO 12103-1 A4 coarse test dust and ISO 12103-1 A2 fine test dust, commercially available from Power Technology Inc. of Burnsville, Minn., was used. A balance accurate to 0.001 grams was used for measurements. A testing surface 100 was provided consisting of a 0.61×0.61 meter rigid panel covered on one side with 4 vinyl flooring tiles, as shown in FIG. 10.

Dust Retention Test Procedure: The test is performed at room temperature (approximately 23° C. and 50% relative humidity). Starting with a clean vinyl tile test surface 100, 1.00 gram of dust is sprinkled about 0.3 meters above the surface 100 to disperse evenly onto the test surface 100 (see FIG. 10). The formation of mounds is avoided. A sifter can be used to insure an even distribution. The test wipe 210 is weighed and then the wipe is attached to the swivel sweeper head 220 (see FIG. 11). The test wipe is positioned such that it is attached to the swivel sweeper in the start zone 10 as shown in FIG. 10. Holding the sweeper handle 250 at about a 45 degree angle, the area of the testing surface 100 is swiped following the test pattern 130 shown in FIG. 10 as dashed lines. While following the pattern as shown in FIG. 10, the sweeper is allowed to glide over the surface 100 without any added pressure. The sweeper 200 should not be lifted until the test pattern is complete and is positioned in the end zone 120. Then, the sweeper 200 is lifted slowly and carefully to bring the swivel sweeper head 220 to the face of the tester. Dust loss is avoided by not tapping the sweeper 200 or making swift movements. The test wipe 210 is removed from the swivel sweeper head 220 by first folding the trailing edge 230 of the test wipe 210 over the test wipe surface and then the leading edge 240 over the test wipe surface where the dust has been captured as shown in FIG. 11. The test wipe 210 is re-weighed and the amount of dust captured is calculated in bin grams (equation: weight in grams of test wipe after test is completed minus weight of test wipe in grams before the test was started equals the amount of dust captured in grams).

TABLE 2

| Sample ID | Filament Shape | Amt. TiO$_2$ (%) | Ave. Sample Basis Weight (gsm) | Ave. filament denier (dpf) | Dust captured by test wipe (grams) | Dust captured by test wipe (%) | Gain in dust pick-up by tri-lobal v. round (%) |
|---|---|---|---|---|---|---|---|
| A1 | Tri-lobal | 0.7 | 15.7 | 1.9 | 0.70 | 70 | 49 |
| B1 | Round | 0.7 | 16.5 | 1.65 | 0.47 | 47 | |
| A2 | Tri-lobal | 0.7 | 33.7 | 1.9 | 0.80 | 80 | 38 |
| B2 | Round | 0.7 | 36.2 | 1.65 | 0.58 | 58 | |
| A3 | Tri-lobal | 0.7 | 68.0 | 1.9 | 0.75 | 75 | 25 |
| B3 | Round | 0.7 | 69.2 | 1.65 | 0.60 | 60 | |
| A4 | Tri-lobal | 0.7 | 86.9 | 1.9 | 0.60 | 60 | 20 |
| B4 | Round | 0.7 | 96.2 | 1.65 | 0.50 | 50 | |
| C1 | Tri-lobal | 7.0 | 14.7 | 1.3 | 0.71 | 71 | 22 |
| D1 | Round | 7.0 | 14.5 | 1.2 | 0.58 | 58 | |
| C2 | Tri-lobal | 7.0 | 33.8 | 1.3 | 0.86 | 86 | 21 |
| D2 | Round | 7.0 | 35.3 | 1.2 | 0.71 | 71 | |

Evaluation for packaging properties. Samples made in accordance with Examples 1, 2, 3, and 4 were tested for opacity and stiffness, which are two properties evaluated for nonwovens used in packaging articles. The results of the opacity testing are reported in Table 3 and the results of the stiffness testing are reported in Table 4. Equipment and Procedure. Opacity was measured using a Colorimeter from Hunter Lab having model no. D25A with a DP-9000 data processor manufactured by Hunter Associates Laboratory, Inc., Reston, Va. Opacity data is reported in Table 3. Stiffness was measured using an automatic F.R.L. cantilever bend tester from Testing Machines Inc. located in Ronkonkoma, N.Y. ASTM D5732-95 was followed to measure for stiffness. Stiffness data is reported in Table 4.

TABLE 3

| Sample ID | Filament Shape | Amt. TiO$_2$ (%) | Ave. Sample Basis Weight (gsm) | Ave. filament denier (dpf) | Opacity (%) | Gain in opacity by tri-lobal v. round (%) |
|---|---|---|---|---|---|---|
| A1 | Tri-lobal | 0.7 | 15.7 | 1.9 | 36 | 94 |
| B1 | Round | 0.7 | 16.5 | 1.65 | 18.5 | |
| A2 | Tri-lobal | 0.7 | 33.7 | 1.9 | 59 | 71 |
| B2 | Round | 0.7 | 36.2 | 1.65 | 34.5 | |
| A3 | Tri-lobal | 0.7 | 68.0 | 1.9 | 81 | 50 |
| B3 | Round | 0.7 | 69.2 | 1.65 | 54 | |
| A4 | Tri-lobal | 0.7 | 86.9 | 1.9 | 72 | 24 |
| B4 | Round | 0.7 | 96.2 | 1.65 | 58 | |
| C1 | Tri-lobal | 7.0 | 14.7 | 1.3 | 43 | 5 |
| D1 | Round | 7.0 | 14.5 | 1.2 | 41 | |
| C2 | Tri-lobal | 7.0 | 33.8 | 1.3 | 66 | 1.5 |
| D2 | Round | 7.0 | 35.3 | 1.2 | 65 | |

The data shown in Table 3 indicates a significant increase in opacity for the lightly pigmented tri-lobal samples of A1-A4. The gain in opacity diminishes in tri-lobal samples C1 and C2, which are more heavily pigmented. While not intending to be bound by theory, the data suggests that light transmission through the filament is the likely mechanism controlling their opacity at low pigmenting load.

TABLE 4

| Sample ID | Filament Shape | Amt. TiO$_2$ (%) | Ave. Sample Basis wt. (gsm) | Ave. Filament denier (dpf) | Cantilever stiffness in machine direction (MD) & cross direction (CD) (cm) | | Compounded Cantilever Stiffness (cm) | Gain in compounded stiffness by tri-lobal v. |
| | | | | | MD | CD | (MD + CD) | round (%) |
|---|---|---|---|---|---|---|---|---|
| A1 | Tri-lobal | 0.7 | 15.7 | 1.9 | 7.9 | 4.5 | 12.4 | 32 |
| B1 | Round | 0.7 | 16.5 | 1.65 | 5.20 | 4.2 | 9.4 | |
| A2 | Tri-lobal | 0.7 | 33.7 | 1.9 | 11.3 | 8.4 | 19.7 | 37 |
| B2 | Round | 0.7 | 36.2 | 1.65 | 8.20 | 6.2 | 14.4 | |
| A3 | Tri-lobal | 0.7 | 68.0 | 1.9 | 13.9 | 10.5 | 24.4 | 20 |
| B3 | Round | 0.7 | 69.2 | 1.65 | 11.20 | 9.2 | 20.4 | |
| A4 | Tri-lobal | 0.7 | 86.9 | 1.9 | 15.6 | 14.1 | 29.7 | 21 |
| B4 | Round | 0.7 | 96.2 | 1.65 | 12.60 | 12 | 24.6 | |
| C1 | Tri-lobal | 7.0 | 14.7 | 1.3 | 6.8 | 3.8 | 10.6 | 20 |
| D1 | Round | 7.0 | 14.5 | 1.2 | 5.3 | 3.5 | 8.8 | |
| C2 | Tri-lobal | 7.0 | 33.8 | 1.3 | 9.2 | 6.6 | 15.8 | 13 |
| D2 | Round | 7.0 | 35.3 | 1.2 | 8.0 | 6 | 14 | |

The data shown in Table 4 reveals a consistent increase in overall stiffness for tri-lobal samples A1-A4. A difference appears to exist between tri-lobal samples A1 and A2 and tri-lobal samples C1 and C2, which are substantially of the same basis weight. While not intending to be bound by theory, it is believed this difference is likely indicative of the dissimilar filament size or denier.

Evaluation for agriculture protective article was conducted in the following manner. Samples made in accordance with Example 1 and 2 were tested for light transmittance. A graphical representation of the light transmittance test results are shown in FIG. 10 and the light transmittance values are reported in Table 5. Equipment: Spectrophotometer UV model 2401-PC made by Shimadzu; Glass synthetic quartz cuvette having a volume of 3.5 milliliter and the following dimensions: height of 45 mm, width of 12.4 mm, and depth of 12.4 mm. Test Procedure: 10 pieces of fabric are tested per sample. The pieces are cut to 12 mm by 45 mm. All 10 pieces of fabric for each sample should be cut the same such that the longer dimension is either the machine direction or the cross direction. Calibrate the spectrophotometer by running a baseline with the cuvettes employed with no sample attached to them. Fix range of wavelength to be scan from 200 to 900 nm. Set recording interval at every 0.5 nm. Attach a cut piece for a given sample to a cuvette, insert the cuvette and run a scan. Repeat for the all of the 10 pieces cut from one sample. Graph the average transmittance spectrum of the 10 pieces for a given sample. Compare transmittance spectrum of different samples by averaging the difference in percent of transmittance at 300, 400, 500, 600, 700 and 800 nm. The % reduction in average light transmittance described in Table 5 indicates reduced average light transmittance from 300 to 800 nm between spunbond made of tri-lobal and round filaments. In particular, an average percentage of light transmittance was calculated in the 300-800 nm wavelength spectrum for tri-lobal filament samples A1 and A2 and compared to an average percentage of light transmittance in the same spectrum for round filament samples B1 and B2.

TABLE 5

| Sample ID | Filament Shape | Amt. TiO$_2$ (%) | Ave. Sample Basis wt. (gsm) | Ave. filament denier (dpf) | Ave. light transmittance from 300 to 800 nm (%) | Reduction in ave. light transmittance (%) |
|---|---|---|---|---|---|---|
| A1 | Tri-lobal | 0.7 | 15.7 | 1.9 | 19.4 | 34 |
| B1 | Round | 0.7 | 16.5 | 1.65 | 29.6 | |
| A2 | Tri-lobal | 0.7 | 33.7 | 1.9 | 4.9 | 48 |
| B2 | Round | 0.7 | 36.2 | 1.65 | 9.5 | |

Evaluation for acoustical performance of fabric was conducted in the following manner: samples made in accordance with Examples 5, 6, and 7 were tested for acoustical absorption coefficient. Results are shown in Table 6. Equipment: One standard small circular impedance tube kit from Brüel & Kjaer type 4206, with a 29 mm inner diameter ID tube configuration and a 29 mm sample holder. The small tube of the Brüel & Kjaer impedance tube kit, type 4206, has a length of 850 mm. Brüel & Kjaer impedance tube kit, type 4206, also includes two 0.25 inch side-vented microphones, Brüel & Kjaer model 4187. The two 0.25 inch side-vented microphones have a fixed distance between them of 2 cm. The impedance tube kit, type 4206, further includes two 0.25 inch preamplifier Brüel & Kjaer model 2670. A Brüel & Kjaer 29 mm cutter was also utilized. The aforementioned equipment may be purchased from Brüel & Kjaer of Denmark having a place of business at DK-2850 Naerum.

Test Procedure: Samples were tested per ASTM E 1050-98 in a lab at room temperature, approximately 23° C., at 1 atmospheric pressure, and 50% relative humidity. To simulate end-use of the product a sample of meltblown web was first inserted in the tube and covered by the sample being tested. The meltblown was affixed to the bottom of the tube with a double-sided tape. This meltblown backing was a 272 gsm, 12.7 mm thick meltblown web manufactured by Johns Manville. All the samples of backing used in the testing reported came from the same roll. All the samples were tested with the side that was against the embossed calender roll during bonding facing toward the noise source. The test was carried from 500 Hz to 6400 Hz. For each sample 3 pieces, 29 mm in diameter were cut from different area of the sample using the cutter. Each piece was tested. Each piece was consistently tested at the same position within the tube at the same distance from the sound source. Results for each piece and the average of the three pieces was reported. The % average gain in acoustical absorbance coefficient is indicated in the far right column of Table 6.

TABLE 6

| Sample | Filament shape | SBPP fiber denier (dpf) | Construct S/M/M/S (nominal gsm per layer) | Acoustical absorbance coefficient at a given frequency in Hertz | | | | | Ave. gain acoust. Absorb. Coeff. (%) |
|---|---|---|---|---|---|---|---|---|---|
| | | | | 2000 | 3000 | 4000 | 5000 | 6000 | |
| E1 | Tri-lobal | 1.9 | 15/8/8/15 | 0.200 | 0.401 | 0.604 | 0.771 | 0.858 | 3.9 |
| G1 | Round | 1.65 | 15/8/8/15 | 0.196 | 0.381 | 0.577 | 0.741 | 0.829 | |
| Gain in acoustical absorbance for E1 compared to G1 (%) | | | | 2.0 | 5.2 | 4.7 | 4.0 | 3.5 | |
| E2 | Tri-lobal | 1.9 | 15/4/4/15 | 0.168 | 0.313 | 0.482 | 0.652 | 0.755 | 7.6 |
| G2 | Round | 1.65 | 15/4/4/15 | 0.157 | 0.286 | 0.441 | 0.606 | 0.706 | |
| Gain in acoustical absorbance for E2 compared to G2 (%) | | | | 4.8 | 9.4 | 9.3 | 7.6 | 6.9 | |
| F1 | Tri-lobal | 1.3 | 15/4/4/15 | 0.176 | 0.331 | 0.508 | 0.679 | 0.778 | 13.0 |
| G2 | Round | 1.65 | 15/4/4/15 | 0.157 | 0.286 | 0.441 | 0.606 | 0.706 | |
| Gain in acoustical absorbance for F1 compared to G2 (%) | | | | 12.1 | 15.7 | 15.2 | 12.0 | 10.2 | |

Table 6 shows the sound absorption improvement of nonwoven material including multi-lobal filaments, and more specifically tri-lobal filaments, when compared to a nonwoven material of similar composition and construct where all the multi-lobal fibers or filaments are replaced by round fibers or filament. To show such an improvement the acoustic adsorption coefficient of Examples 5, 6, and 7 were measured by the impedance tube test method ASTM E 1050-98.

From the foregoing, it will be observed that modifications and variations can be affected without departing from the true spirit and scope of the novel concepts of the present invention. It is to be understood that no specific limitation with respect to the specific embodiments illustrated herein is intended or should be inferred. This invention can, however, be embodied in different forms and should not be construed as limited to the embodiments set forth herein; rather, these embodiments are provided so that this disclosure will be thorough and complete, and will fully convey the scope of the invention to those skilled in the art.

What is claimed is:

1. A nonwoven polymer breathable barrier material having 100% by weight content of a 100% monocomponent multi-lobal fiber having a cross section selected from the group consisting of tetra-lobal, penta-lobal, and hexa-lobal, wherein said cross section comprises separate multiple lobed portions extending from a centrally located portion of the fiber, said nonwoven polymer breathable barrier material useful for protecting crops selected from the group consisting of fruit, vegetable, and mixtures thereof from frost and insects, wherein the nonwoven polymer breathable barrier material reduces visible light transmittance by at least 10% compared to a nonwoven material that differs insofar as all the multi-lobal fiber is replaced with 100% monocomponent round fibers wherein fiber polymer chemical composition, fiber/filament denier, fabric basis weight, and overall material construction are approximately the same as the nonwoven material having the 100% multi-lobal fiber content except for cross-sectional shape of the multi-lobal fiber instead being round.

2. The nonwoven material of claim 1, wherein crops protected by the breathable barrier material produce a crop yield of at least 5% greater than the crop yield of crops protected by said compared nonwoven material having round fibers.

3. The nonwoven material of claim 1, wherein the nonwoven polymer breathable barrier material reduces light transmittance in the light wavelength range of from 300 nm to 800 nm by 10% to 65% compared to said nonwoven material having round fibers.

4. The nonwoven material of claim 1, wherein the nonwoven material is a nonwoven polymer web having a basis weight of at least about 8 gsm and not greater than about 50 grams per square meter.

5. The nonwoven material of claim 1, wherein the nonwoven material is a nonwoven polymer web that is a spunmelt fabric made from a polyolefin that is selected from the group consisting of polyethylene, polypropylene and copolymers thereof, and has filaments having an average denier per filament of at least 0.8 and not greater than 6.

6. The nonwoven material of claim 1, wherein the nonwoven material is a nonwoven polymer web that is a spunmelt fabric made from the group consisting of a polyester, a co-polyester, a polyamide, polylactic acid, and mixtures thereof.

7. A nonwoven material of claim 1, wherein crops protected by the material produce a color uniformity in fruits at maturity of at least 10% greater than the color uniformity in fruits at maturity protected by a material of said compared nonwoven material having round fibers.

8. A protective article comprising the nonwoven material of claim 1 and least one different or similar layer for protectively enclosing at least one food crop selected from the group consisting of fruit and vegetables.

9. The nonwoven material of claim 1, wherein crops protected by the breathable barrier material produce a crop yield of at least 10% greater than the crop yield of crops protected by said compared nonwoven material having round fibers.

10. The nonwoven material of claim 9, wherein the nonwoven polymer breathable barrier material reduces light transmittance in the light wavelength range of from 300 nm to 800 nm by 10% to 65% compared to said nonwoven material having round fibers.

11. A nonwoven material of claim 1, wherein crops protected by the material produce a color uniformity in fruits at maturity of at least 15% greater than the color uniformity in fruits at maturity protected by a material of said compared nonwoven material having round fibers.

12. The nonwoven material of claim 11, wherein the nonwoven polymer breathable barrier material reduces light transmittance in the light wavelength range of from 300 nm to 800 nm by 10% to 65% compared to said nonwoven material having round fibers.

13. The nonwoven material of claim 1, wherein the nonwoven material is a bag having a basis weight of at least about 8 gsm and not greater than about 60 gsm, and said bag operable to cover fruits that grow in trees during their growth and ripening period.

14. The nonwoven material of claim 13, wherein the nonwoven polymer breathable barrier material reduces light transmittance in the light wavelength range of from 300 nm to 800 nm by 10% to 65% compared to said nonwoven material having round fibers.

15. A nonwoven wipe article having 100% by weight content of a substantially continuous 100% monocomponent multi-lobal fiber having a cross-section selected from the group consisting of tetra-lobal, penta-lobal, and hexa-lobal, wherein said cross section comprises separate multiple lobed portions extending from a centrally located portion of the fiber, wherein such nonwoven wipe article has capacity to retain at least about 10% more particles than a comparable nonwoven material that differs insofar as all the multi-lobal fiber is replaced with 100% monocomponent round fibers wherein fiber polymer chemical composition, fiber/filament denier, fabric basis weight, and overall material construction are approximately the same as the nonwoven wipe article having 100% by weight multi-lobal fiber content except for cross-sectional shape of the multi-lobal fiber instead being round.

16. A nonwoven wipe article of claim 15, wherein the wipe article is a web made from a polymer selected from the group consisting of a polyester, co-polyester, polyamide and polylactic acid polymer.

17. A nonwoven wipe article of claim 15 that is a wipe useful to contain cellulose-based products in a clean room environment.

18. A nonwoven wipe article of claim 15, wherein the wipe article is useful in cleaning wet or dry surfaces.

19. A nonwoven wipe article of claim 15, wherein the wipe article is a single nonwoven polymer web is made from a polyolefin selected from the group consisting of polyethylene, polypropylene and copolymers thereof, and fibers having an average denier per filament of at least 0.8 and not greater than 6.

20. A nonwoven material useful as a component of packaging material having 100% by weight content of a substantially continuous 100% monocomponent multi-lobal fiber having a cross-section selected from the group consisting of tetra-lobal, penta-lobal, and hexa-lobal, wherein said cross section comprises separate multiple lobed portions extending from a centrally located portion of the fiber, wherein such nonwoven material has a stiffness performance in accordance with ASTM D5732-95 of at least 10% greater than a comparable material of similar overall construction that differs insofar as replacing all the multi-lobal fiber of the nonwoven polymer web with 100% monocomponent round fiber wherein fiber polymer chemical composition, fiber/filament denier, fabric basis weight, and overall material construction are approximately the same as the nonwoven material having the 100% multi-lobal fiber content except for cross-sectional shape of the multi-lobal fiber instead being round.

21. A material of claim 20, wherein the material is a spunmelt web and has a basis weight of at least about 15 grams per square meter and not greater than about 100 grams per square meter.

22. A material of claim 20, wherein the material is a web made from a polyolefin that is selected from the group consisting of polyethylene, polypropylene and a co-polymer thereof, and wherein the fiber has an average denier per filament of at least 0.8 and not greater than 6.

23. A material of claim 20, wherein the material is a web made from a polymer selected from the group consisting of a polyester, a co-polyester, a polyamide, polylactic acid polymer.

24. A nonwoven material useful as a component for sound absorption having 100% by weight content of a substantially continuous 100% monocomponent multi-lobal fiber having a cross-section selected from the group consisting of tetra-lobal, penta-lobal, and hexa-lobal, wherein said cross section comprises separate multiple lobed portions extending from a centrally located portion of the fiber, wherein such nonwoven material has an average acoustical absorption coefficient of at least 3% greater within the 2000 to 6000 Hz range, per ASTM E 1050-98, than a comparable material of similar overall construction that differs insofar as all multi-lobal fiber of the nonwoven polymer web is replaced with 100% monocomponent round fiber wherein fiber polymer chemical composition, fiber/filament denier, fabric basis weight, and overall material construction are approximately the same as the nonwoven material having the 100% multi-lobal fiber content except for cross-sectional shape of the multi-lobal fiber instead being round.

25. The material of claim 24, wherein the nonwoven material is made from a spunmelt fabric comprising a polyolefin selected from the group consisting of polyethylene, polypropylene and a copolymer thereof and comprising filaments having an average denier per filament of at least 0.8 and not greater than 6.

26. The material of claim 24, wherein the nonwoven material is made from a spunmelt fabric comprising a polymer selected from the group consisting of polyester, co-polyester, polyamide and polylactic acid polymers.

27. A sound absorption article comprising the component material of claim 24 and at least one different layer.

28. A nonwoven material useful as a component for sound absorption having 100% by weight content of a substantially continuous 100% monocomponent multi-lobal fiber having a cross-section selected from the group consisting of tetra-lobal, penta-lobal, and hexa-lobal, wherein said cross section comprises separate multiple lobed portions extending from a centrally located portion of the fiber, wherein such nonwoven material has an average acoustical absorption coefficient of at least 5% greater within the 2000 to 6000 Hz range, per ASTM E 1050-98, than a comparable material of similar overall construction that differs insofar as all multi-lobal fiber of the nonwoven polymer web is replaced with 100% monocomponent round fiber wherein fiber polymer chemical composition, fiber/filament denier, fabric basis weight, and overall material construction are approximately the same as the nonwoven material having the 100% multi-lobal fiber content except for cross-sectional shape of the multi-lobal fiber instead being round.

29. A nonwoven material useful as a component for sound absorption having 100% by weight content of a substantially continuous 100% monocomponent multi-lobal fiber having a cross-section selected from the group consisting of tetra-lobal, penta-lobal, and hexa-lobal, wherein said cross section comprises separate multiple lobed portions extending from a centrally located portion of the fiber, wherein such nonwoven material has an average acoustical absorption coefficient of at least 7% greater within the 2000 to 6000 Hz range, per ASTM E 1050-98, than a comparable material of similar overall construction that differs insofar as all multi-lobal fiber of the nonwoven polymer web is replaced with 100% monocomponent round fiber wherein fiber polymer chemical composition, fiber/filament denier, fabric basis weight, and overall material construction are approximately the same as the nonwoven material having the 100% multi-lobal fiber content except for cross-sectional shape of the multi-lobal fiber instead being round.

* * * * *